(12) United States Patent
Ryu et al.

(10) Patent No.: US 7,917,183 B2
(45) Date of Patent: Mar. 29, 2011

(54) METHOD OF CONTROLLING IDLE MODE IN BROADBAND WIRELESS ACCESS SYSTEM

(75) Inventors: Gi Seon Ryu, Seoul (KR); Beom Joon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1117 days.

(21) Appl. No.: 11/571,139

(22) PCT Filed: Jun. 25, 2005

(86) PCT No.: PCT/KR2005/001999
§ 371 (c)(1),
(2), (4) Date: Dec. 21, 2006

(87) PCT Pub. No.: WO2006/001674
PCT Pub. Date: Jan. 5, 2006

(65) Prior Publication Data
US 2007/0243910 A1  Oct. 18, 2007

(30) Foreign Application Priority Data

Jun. 25, 2004 (KR) .................. 10-2004-0048434
Jul. 9, 2004 (KR) .................. 10-2004-0053666

(51) Int. Cl.
*H04B 1/38* (2009.01)
(52) U.S. Cl. ...................... 455/574; 455/458
(58) Field of Classification Search ........... 455/343.2, 455/343.3, 343.4, 343.5, 432.1, 435.1, 436, 455/440, 442–444, 448, 458, 522, 524, 525, 455/526, 574, 515; 370/311, 312, 318, 329, 370/330, 337, 338; 340/7.1, 7.2, 7.21, 7.28, 7.32, 7.33, 7.34, 7.35
See application file for complete search history.

(56) References Cited

U.S. PATENT DOCUMENTS 6,505,058 B1   1/2003 Willey
6,999,753 B2 * 2/2006 Beckmann et al. ........ 455/412.2
(Continued)

FOREIGN PATENT DOCUMENTS

CN           1425261        6/2003
(Continued)

OTHER PUBLICATIONS

Phillip Barber et al., "MSS Idle Mode," IEEE 802.16 Broadband Wireless Access Working Group, IEEE C802.16e-04/42r7, Mar. 2004.

*Primary Examiner* — Anthony S Addy
(74) *Attorney, Agent, or Firm* — Lee, Hong, Degerman, Kang & Waimey (57) ABSTRACT

A method of controlling an idle mode in a broadband wireless access system is disclosed, in which paging information is allocated to a mobile subscriber station to enter an idle mode via a base station belonging to at least two paging groups and in which the idle mode is efficiently controlled by improving a method of changing paging information of a mobile subscriber station in idle mode. The present invention includes the steps of receiving a message requesting a transition to the idle mode from a mobile subscriber station, transmitting paging information for the entire paging groups of the base station to the mobile subscriber station, and transmitting a paging message to the mobile subscriber station according to the paging information of each of the paging groups to which the base station belongs.

7 Claims, 2 Drawing Sheets

U.S. PATENT DOCUMENTS

| | | | |
|---|---|---|---|
| 7,076,258 B2 * | 7/2006 | Motegi et al. | 455/456.1 |
| 7,197,323 B2 * | 3/2007 | Terry | 455/458 |
| 2003/0103479 A1 | 6/2003 | Anderson et al. | |
| 2004/0229605 A1 * | 11/2004 | Hwang et al. | 455/426.1 |
| 2004/0254980 A1 * | 12/2004 | Motegi et al. | 709/203 |
| 2005/0250474 A1 * | 11/2005 | Hong et al. | 455/411 |
| 2005/0272481 A1 * | 12/2005 | Kim | 455/574 |
| 2005/0277429 A1 * | 12/2005 | Laroia et al. | 455/458 |
| 2007/0060175 A1 * | 3/2007 | Park et al. | 455/458 |

FOREIGN PATENT DOCUMENTS

| | | |
|---|---|---|
| EP | 1107626 | 6/2001 |
| EP | 1213939 | 6/2002 |
| EP | 1292168 | 3/2003 |
| KR | 10-0308029 | 10/2001 |
| WO | 02/43412 | 5/2002 |
| WO | 03/105519 | 12/2003 |

* cited by examiner

FIG. 2

METHOD OF CONTROLLING IDLE MODE IN BROADBAND WIRELESS ACCESS SYSTEM

TECHNICAL FIELD

The present invention relates to a broadband wireless access system, and more particularly, to a method of controlling an idle mode in a broadband wireless access system. Although the present invention is suitable for a wide scope of applications, it is particularly suitable for controlling the idle mode efficiently in a base station or a mobile subscriber station by improving a paging information transmitting method in the broadband wireless access system.

BACKGROUND ART

Generally, a broadband wireless access system supports an idle mode to minimize the power consumption of a mobile subscriber station (hereinafter abbreviated MSS).

A paging zone is defined as an entire zone that is taken charge of by a plurality of base stations included in one paging group. Each of the base stations included in the same paging zone has the same paging cycle Paging_Cycle and the same paging offset Paging_Offset.

The MSS can request a transition to an idle mode to the base station. The base station then delivers its paging group ID (Paging_group ID), a corresponding paging cycle and a corresponding paging offset. Thus, the corresponding MSS enter the idle mode.

During an idle mode, the MSS is capable of deciding whether to keep or terminate the idle mode via the paging delivered in the broadcast form from the base station each paging cycle.

If there occurs a traffic that has to be transmitted by an MSS in an idle mode, the MSS can terminate the idle mode at any time. If there occurs a traffic that has to be transmitted to an MSS in an idle mode, a base station is capable of enabling the MSS to terminate the idle mode via paging. Moreover, if an MSS, which has moved to another paging zone or has lost its sync, in an idle mode is unable to receive a paging at a predefined time, the MSS terminates the idle mode.

During the idle mode, the MSS needs not to perform a handover procedure in moving between base stations belonging to the same paging zone. Hence, the MSS needs not to transmit uplink information for the handover procedure to the base station, thereby reducing the corresponding power consumption. Namely, the MSS in the idle mode normally receives a periodic paging to secure its free move in the same paging zone without performing the handover procedure while there is no information to transmit/receive.

An idle mode transition process of an MSS according to a related art is explained in detail as follows.

First of all, an MSS transmits an idle mode request message to a serving base station to enter an idle mode. The serving base station then transmits a paging group ID, a paging cycle and a paging offset to the MSS via an idle mode response message and releases connection information to the MSS, radio resources allocated to the MSS and the like.

Table 1 shows an example of a format of an idle mode response message transmitted from a base station to an MSS requesting a transition to an idle mode, in which a conventional de-registration command message (DREG-CMD) is used.

TABLE 1

| Syntax | Size | Notes |
| --- | --- | --- |
| DREG-CMD__Message__Format( ) { | | |
| Management Message Type = 29 | 8 bits | |
| Action code | 8 bits | |
| TLV encoded parameters | Variable | |
| } | | |

Table 2 and Table 3 shows examples of an action code definition of the de-registration command message and a format of TLV encoding, respectively.

TABLE 2

| Action Code | Action |
| --- | --- |
| 0x00 | MSS shall leave the current channel and attempt to access another channel |
| 0x01 | MSS shall listen to the current channel but shall not transmit until an RES_CMD message or DREG_CMD with Action Code is received. |
| 0x02 | MSS shall listen to the current channel but shall only transmit on the Basic, Primary Management, and Secondary Management Connections. |
| 0x03 | MSS shall return to normal operations and may transmit on any of its active connections. |
| 0x04 | MSS shall terminate current Normal Operations with the BS, the BS shall transmit this action code only in response to any MSS DREG_REQ. |
| 0x05 | Require MSS de-registration from Serving BS and request initiation of MSS idle mode. |
| 0x06 | The MSS may retransmit the DREG_REQ message after the time duration (REQ-duration) given by. |
| 0x07 | The MSS shall not retransmit the DREG_REQ message and shall wait for the DREG-CMD message. |
| 0x08-0xFF | Reserved |

TABLE 3

| Name | Type | Length | Value |
| --- | --- | --- | --- |
| Paging Information | | 4 | Bits 15:0 -PAGING_CYCLE<br>Bits 23:16 - PAGING OFFSET<br>Bits 31:24 - Paging Group ID |
| REQ - Duration | | 1 | Standby value for retransmission of DREG-REQ message |

If an action code of the de-registration command is set to 0x05 corresponding to an idle mode approval, the paging information shown in Table 3 is included in the de-registration command message to be transmitted to the MSS.

The base station notifies a MAC address of the MSS entering the idle mode to other base stations of the paging group to which the corresponding base station belongs. Hence, the corresponding base station enables the latter base stations to page the corresponding MSS with the same paging cycle and the same paging offset.

Via a broadcast-formatted paging message transmitted from the base station according to the paging cycle, the MSS allowed to enter the idle mode by the base station via the idle mode response message decides whether there exists a downlink traffic transmitted to the MSS itself exists, whether to perform a ranging, or whether to keep maintaining the idle mode.

Once confirming that there exists the downlink traffic via the paging message, the MSS terminates the idle mode and re-registers to a network to receive downlink data. If the MSS is requested to perform the ranging via the paging message, the MSS performs the ranging so that the base station can update a location of the MSS and a valid idle-mode MSS list. In case of failing in receiving a prescribed operation request via the paging message, the MSS keeps maintaining the idle mode.

If the MSS moves away into another base station of a different paging group or if the MSS terminates the idle mode due to the uplink or downlink traffic occurrence, the previous base station to which the MSS has belonged to notifies such a fact to the rest of the base stations of the previous paging group so that the corresponding MSS can be deleted from the idle mode list.

Table 4 shows an example of a data format of a broadcast-formatted paging message received by an MSS in idle mode from base stations of one paging group with a uniform cycle according to a related art.

TABLE 4

| Syntax | Size | Notes |
| --- | --- | --- |
| MOB_PAG-ADV_Message_Format( ) {  Management Message Type=?? | 8 bits | |
| Num_Paging Group IDs | 8 bits | Number of Paging Group IDs in this message |
| For(i=0; i<Num_Paging_Group_IDs; i++) {  Paging Group ID | 8 bits | |
| } For(j=0; j<Num_MACs; j++) { | | Number of MSS MAC Addresses in message can be determined from the length of the message (found in the generic MAC header). |
| MSS MAC address hash | 24 bits | The hash is obtained by computing a CRC24 on the MSS 48-bit MAC address. The polynomial for the calculation is 0x864CFB. |
| Action Code | 2 bits | Paging action instruction to MSS 00 = No Action Required 01 = Perform Ranging to establish location and acknowledge message 10 = Enter Network 11 = Reserved |
| Reserved | 6 bits | |
| } } | | |

The paging message includes a paging group ID indicating a logical belonging of the transmitting base station, the MSS is identified by an MSS MAC address hash, and one paging message includes at least one or more MAC addresses. Moreover, the paging message transmits an action code to each MSS identified by corresponding MSS MAC address hash. The action code instructs a next action of the MSS in idle mode.

However, the related art method of allocating the paging information to the MSS in idle mode has the following problems.

First of all, the MSS, which enters the idle mode in the base station standing on a boundary between paging groups, may need considerable power consumption, which is explained in detail as follows.

The base station standing on the boundary between paging groups can have at least two paging group IDs to enable a flexible network design, thereby having at least two paging cycles and paging offsets. Namely, The base station standing on the boundary between paging groups can belong to at least two paging groups.

In case of receiving an idle mode request from an MSS, the base station belonging to the at least two paging groups allocates a random paging group ID among paging group IDs, to which the base station belongs, a corresponding paging cycle and a corresponding paging offset to transmit to the MSS via an idle mode response message. Yet, Since the MSS having entered the idle mode via the base station standing on the boundary between paging groups may exist on the boundary between the paging groups, it is highly probable that the MSS will move away into a different paging group from the allocated paging group in a short time.

If the idle-mode MSS having a specific paging group allocated thereto moves to a base station belonging to the different paging group, a paging cycle is changed. Hence, the corresponding MSS may not receive the paging message transmitted from the previously allocated paging group. And, the corresponding MSS should terminate the idle mode and should enter a normal operation mode.

Namely, it is highly probable that the MSS having entered the idle mode via the base station standing on the boundary between the paging groups terminates the idle mode quickly to enter the normal operation mode. And, the MSS needs to transmit/receive uplink/downlink message to enter the idle mode via the base station belonging to the new paging group, thereby increasing its power consumption.

Secondly, since a base station is unable to change an initial paging cycle and offset, which are initially allocated when an MSS enters an idle mode, as long as the MSS maintains the idle mode, it is difficult to adjust a paging load of the base station.

Thirdly, in case that a base station having at least two paging group IDs allocates paging information to an MSS, there is no concrete reference for what kind of paging group information shall be allocated to the MSS. Namely, if one paging information of the at least two paging groups is allocated, the paging information is allocated by selecting the paging group randomly without considering a paging load of the paging group.

DISCLOSURE OF THE INVENTION

Accordingly, the present invention is directed to a method of controlling an idle mode in a broadband wireless access system that substantially obviates one or more of the problems due to limitations and disadvantages of the related art.

An object of the present invention is to provide a method of controlling an idle mode in a broadband wireless access system, in which paging information is efficiently transmitted to an MSS entering an idle mode via a base station having at least two paging group IDs.

Another object of the present invention is to provide a method of controlling an idle mode in a broadband wireless access system, by which a base station can change paging information of each MSS in idle mode via a paging message if necessary.

A further object of the present invention is to provide a method of controlling an idle mode in a broadband wireless access system, in which paging information is allocated by selecting a paging group to achieve a paging load balance in case that a base station having at least two paging group IDs allocates the paging information to an MSS entering the idle mode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in controlling an idle mode by a base station belonging to at least two paging groups in a broadband wireless access system, an idle mode control method according to the present invention includes the steps of receiving a message requesting a transition to the idle mode from a mobile subscriber station, transmitting paging information for the entire paging groups of the base station to the mobile subscriber station, and transmitting a paging message to the mobile subscriber station according to the paging information of each of the paging groups to which the base station belongs.

To further achieve these and other advantages and in accordance with the purpose of the present invention, in controlling an idle mode by a base station belonging to at least two paging groups in a broadband wireless access system, an idle mode control method includes the steps of receiving a message requesting a transition to the idle mode from a mobile subscriber station, comparing paging loads of the at least two paging groups to each other, transmitting paging information for at least one of the at least two paging groups to the mobile subscriber station according to a result of the comparing step, and transmitting a paging message to the mobile subscriber station according to the paging information of the at least one paging group.

To further achieve these and other advantages and in accordance with the purpose of the present invention, in transmitting paging information from a base station to a mobile subscriber station in a broadband wireless access system, an idle mode control method includes the steps of transmitting a first paging information to the mobile subscriber station requesting to enter an idle mode, transmitting a second paging information changed via a paging message transmitted according to the first paging information, and transmitting a paging message according to the second paging information.

To further achieve these and other advantages and in accordance with the purpose of the present invention, in controlling an idle mode in a mobile subscriber station of a broadband wireless access system, an idle mode control method includes the steps of receiving paging information for at least two paging groups to which a base station belongs from the base station belonging to the at least two paging groups, receiving at least two paging messages transmitted from the base station according to the paging information of each of the paging groups to which the base station belongs, and performing actions instructed by the at least two paging messages.

To further achieve these and other advantages and in accordance with the purpose of the present invention, in controlling an idle mode in a mobile subscriber station of a broadband wireless access system, an idle mode control method includes the steps of requesting a transition to the idle mode to a base station, receiving a first paging information from the base station, receiving a second paging information changed via a paging message transmitted according to the first paging information, receiving a paging message according to the second paging information, and performing an action instructed by the paging message.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

First of all, the present invention is characterized in that a base station having at least two paging group IDs allocates the entire paging group IDs to which the base station belongs and the corresponding paging information to an MSS entering an idle mode. Namely, the base station includes the paging information of the entire paging groups to which the base station belongs in an idle mode response message that will be transmitted to the MSS, and transmits a backbone message to other base stations of the paging group, to which the base station belongs, to add the corresponding MSS to an idle mode MSS list of each of the base stations of the corresponding paging group. In doing so, it is preferable that the paging information includes a paging group ID, a paging cycle and a paging offset.

Having received the paging information for the at least two paging groups from the base station, the MSS tunes synchronization to receive a paging message based on the paging cycle and the paging offset included in each paging information. For instance, in case of receiving two paging group IDs, the MSS tunes two downlink synchronizations using the cycles and offsets corresponding to the paging groups to receive the entire paging messages transmitted from the paging groups, respectively.

The present invention is characterized in that a base station having at least two paging group IDs can assign the paging group ID, which has a small paging load among paging groups belonging to the base station, and paging information associated with the allocated paging group ID to an MSS entering an idle mode.

And, the present invention is characterized in that a base station changes such paging information of an MSS as a paging group ID, a paging cycle and a paging offset via a paging message of a broadcast format. In this case, it is preferable that the base station transmits the paging message by including the changed paging cycle and offset in the paging message so that the MSS can change the paging information via an action code included in the paging message.

Figure 1:
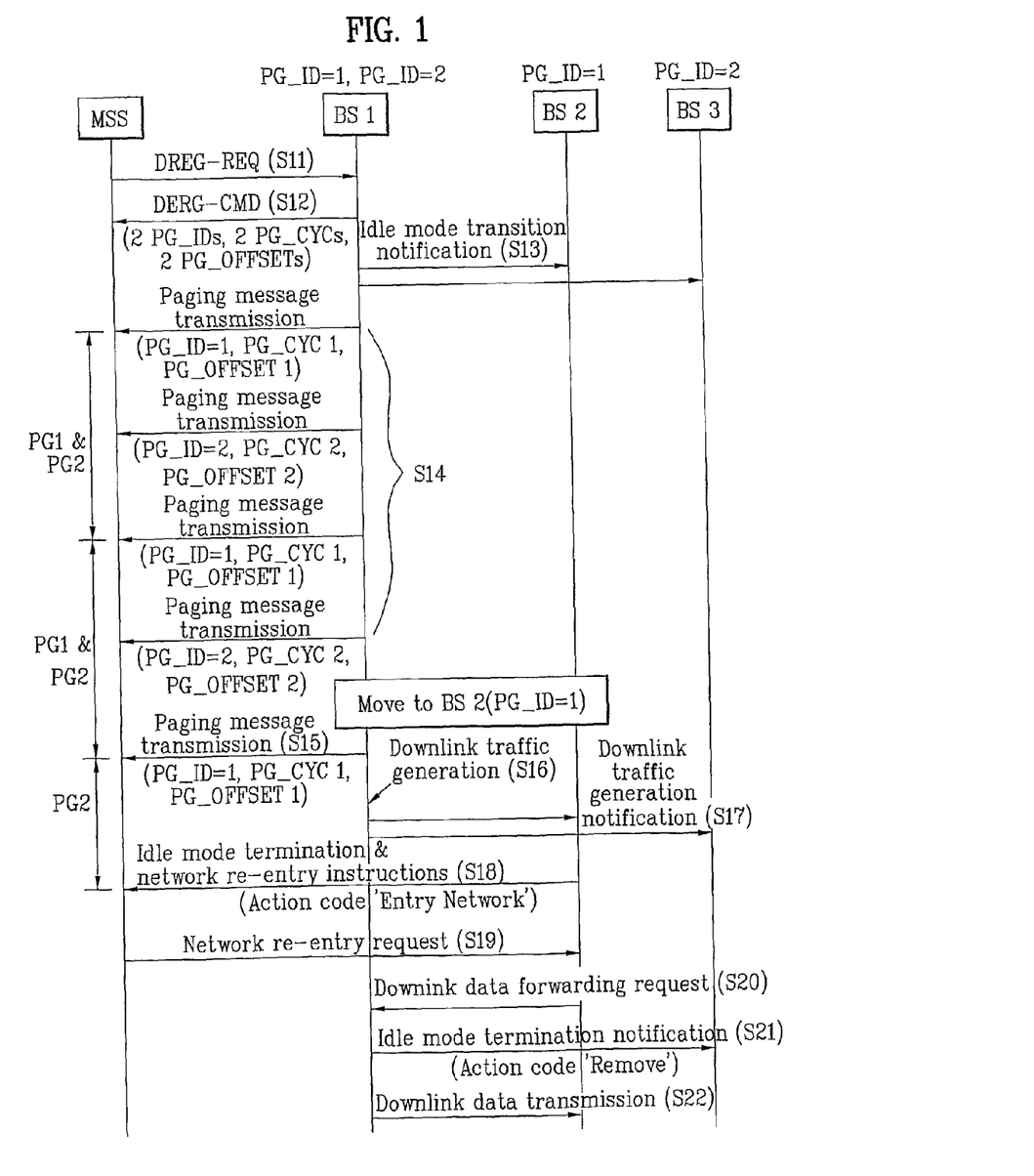
FIG. 1 is a flowchart of an idle mode control method according to one preferred embodiment of the present invention.

FIG. 1 is a flowchart of an idle mode control method according to one preferred embodiment of the present invention, which shows an embodiment that an MSS within a cell of a base station belonging to at least two paging groups enters an idle mode.

Referring to FIG. 1, a mobile subscriber station MSS transmits an idle mode request (DREG-REQ) message to a first base station BS1 to which the mobile subscriber station MSS belongs to enter an idle mode (S11). In this case, the first base station BS1 is a base station belonging to both a first paging group and a second paging group.

The first base station BS1 having received the idle mode request message allows the mobile subscriber station MSS to enter the idle mode by transmitting paging information including a paging group ID to which the first base station BS1 belongs, a paging cycle and a paging offset to the mobile subscriber station MSS via an idle mode response (DREG-CMD) message. In doing so, the first base station BS1, which belongs to both of the first and second paging groups, transmits first paging group information and second paging group information to the mobile subscriber station MSS (S12).

The first base station BS1 transmits a backbone message to other base stations BS2 and BS3 of the paging groups to which the first base station BS1 belong, i.e., the first and second paging groups, to notify that the mobile subscriber station MSS has entered the idle mode (S13). Each of the base stations BS2 and BS3 having received the backbone message additionally adds the mobile subscriber station MSS to an idle mode MSS list. In case of needing to transmit a paging message to the mobile subscriber station MSS, the corresponding base station BS2 or BS3 transmits the paging message according to the paging cycle of the corresponding paging group to which the base station BS2 or BS3 belongs.

The mobile subscriber station MSS having entered the idle mode does not receive a downlink traffic but performs an operation just for receiving the paging message transmitted from the first base station BS1 according to the corresponding paging cycle. Hence, the mobile subscriber station MSS having entered the idle mode can reduce its power consumption. In case of moving between base stations belonging to the same paging group, the mobile subscriber station MSS does not perform a separate handover to reduce its power consumption.

Since the first base station BS1 belongs to both of the first and second paging groups, the mobile subscriber station MSS receives the paging message transmitted from the first base station BS1 to correspond to the paging cycles of the first and second paging group (S14).

Once moving to the second base station BS2 belonging to the first paging group only from the first base station BS1, the mobile subscriber station MSS maintains the idle mode and receives the paging message for the first paging group transmitted from the second base station BS2 only (S15). By confirming that the paging message for the first paging group is received only and by confirming that the paging message for the second paging group is not received, the mobile subscriber station MSS decides that it has moved to a domain of the first paging group and then stops the operation for receiving the paging message of the second paging group. In other words, the mobile subscriber station MSS operates not during the paging cycle of the second paging group but during the paging cycle of the first paging group.

Although the mobile subscriber station MSS has moved to the second base station BS2, the first base station BS1 transmits the paging messages of the first and second paging groups according to the corresponding paging cycles, respectively. In doing so, the mobile subscriber station MSS does not transmit a separate uplink traffic to the first base station BS1 although not receiving the paging message of the second paging group.

If a downlink traffic for the mobile subscriber station MSS is generated from the first base station BS1 (S16), the first base station BS1 transmits a backbone message, which indicates that the downlink traffic for the mobile subscriber station MSS is generated, to other base stations of the first paging group to which the first base station BS1 belongs an to other base stations of the second paging group (S17).

Having recognized the downlink traffic generation, each of the base stations of the first and second paging groups terminates the idle mode of the mobile subscriber station MSS and transmits a paging message instructing a network re-entry to the mobile subscriber station MSS according to the corresponding cycle (S18). In this case, the mobile subscriber station MSS confirms the instruction of the base station via an action code included in the paging message.

Having received the paging message instructing the idle mode termination from the second base station BS2, the mobile subscriber station MSS transmits a ranging request message to the second base station BS2 to which the mobile subscriber station MSS currently belongs to terminate the idle mode and to initiate a network re-entry procedure (S19).

The second base station BS2 having received the ranging request message transmits a backbone message to the first base station BS1 to notify that the mobile subscriber station MSS currently belongs to its management zone and to request to forward the downlink data generated from the first base station BS1 (S20).

The first base station BS1 transmits a backbone message to the base stations of the first and second paging groups to notify that the mobile subscriber station MSS has terminated the idle mode (S21) and transmits the downlink data, which will be delivered to the mobile subscriber station MSS, to the second base station BS2 (S22). Each of the base stations having received the backbone message from the first base station BS1 deletes the mobile subscriber station MSS from the idle mode MSS list.

In the paging information allocating method according to the present invention, if the mobile subscriber station requests the idle mode to the base station belonging to the at least two paging groups, the base station allocates the paging information of the entire paging groups to which the base station belongs and each base station of the paging group adds the mobile subscriber station to its idle ode MSS list to manage. Hence, in case that the mobile subscriber station moves to the area of each paging group of which paging information is known to the mobile subscriber station, the mobile subscriber station can maintain its idle mode and can reduce its power consumption as well.

Figure 2:
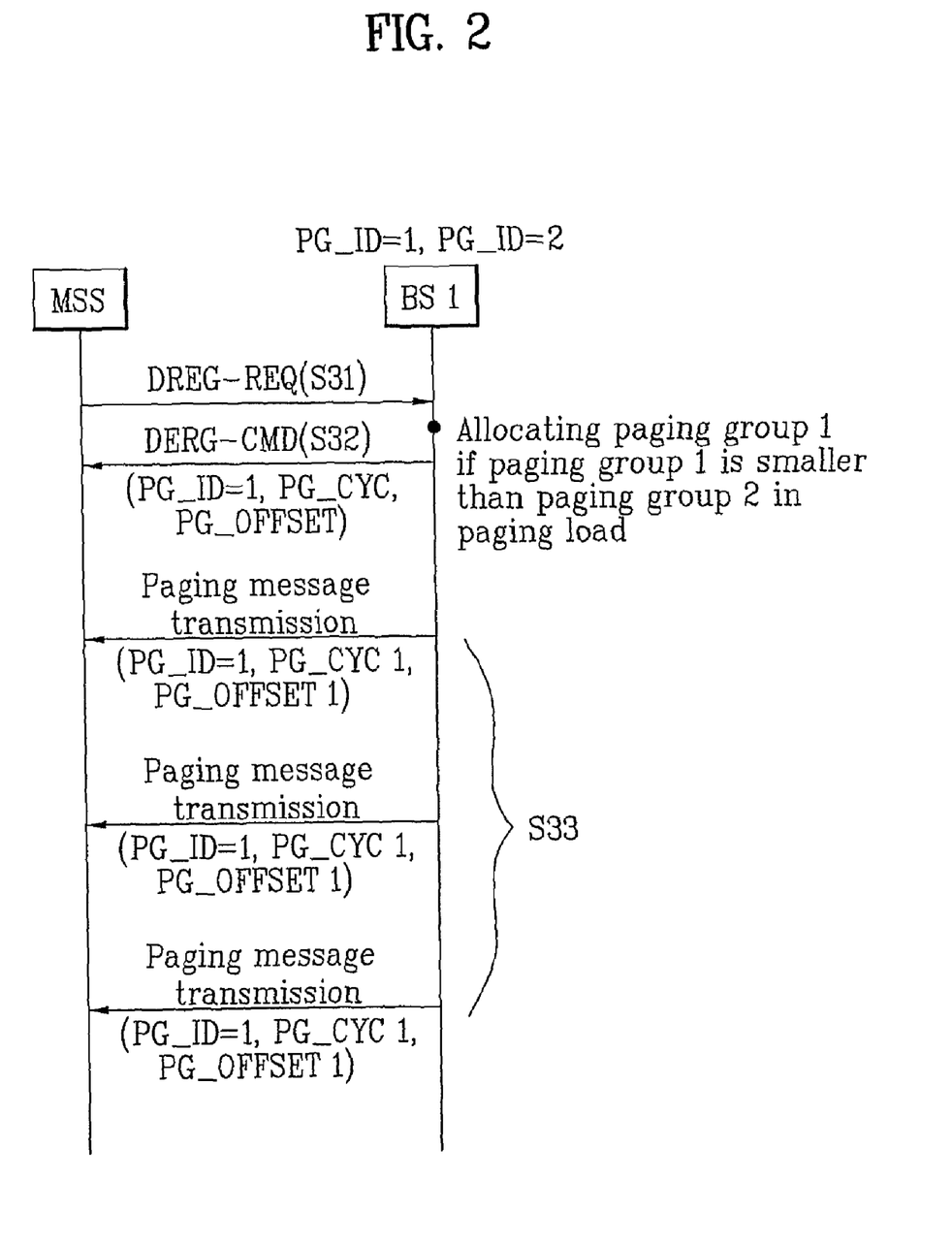
FIG. 2 is a flowchart of an idle mode control method according to another preferred embodiment of the present invention.

FIG. 2 is a flowchart of an idle mode control method according to another preferred embodiment of the present invention, in which a base station belonging to at least two paging groups allocates paging information of the paging group to mobile subscriber stations within a cell with a random priority.

Referring to FIG. 2, a mobile subscriber station MSS transmits an idle mode request message to a base station BS1 to which the mobile subscriber station MSS belongs to enter an idle mode (S31). And, the base station BS1 belongs to both a first paging group and a second paging group.

The base station BS1 having received the idle mode request message decides whether to transmit paging information for which one of the paging groups, to which the base station BS1 belongs, to the mobile subscriber station MSS. The paging group can be determined in various ways. Preferably, the paging group is determined by taking a paging load between the paging groups, to which the base station BS1 belongs, as a reference. Namely, the base station BS1 compares paging loads of the paging groups, to which the base station BS1 belongs, to each other and then allows the mobile subscriber station MSS to enter the idle mode by transmitting the paging information including a paging group ID, paging cycle and paging offset of the paging group having a smaller paging load to the mobile subscriber station MSS via an idle mode response (DREG-CMD) message (S32).

The paging load can be defined according to data volume of a paging message transmitted to mobile subscriber stations in idle mode from the base station belonging to each of the paging groups. And, the paging load increases as the number of the mobile subscriber stations in idle mode is raised higher.

Assuming that the paging load of the first paging group is smaller than that of the second paging group, the base station BS1 having received the idle mode request message from the mobile subscriber station MSS compares the paging load of the first paging group to the paging load of the second paging group and then transmits the paging information of the first paging group having the smaller paging load to the mobile subscriber station MSS.

The mobile subscriber station MSS having received the paging information of the first paging group receives a paging message transmitted from the base station BS1 according to the paging cycle of the first paging group (S33).

Thus, in the method of transmitting the paging information of the paging group having the smaller paging load among the paging groups, to which the base station belongs, to the mobile subscriber station MSS entering the idle mode from the base station belonging to the at least two paging groups, the paging information for the paging group having the smallest paging load among the paging groups is transmitted or the paging information of the at least two paging groups having smaller paging loads with priority.

A paging information allocating method according to the present invention according to another embodiment of the present invention is explained as follows. In the following embodiment of the present invention, a base station dynamically allocates paging information to a mobile subscriber station in idle mode.

A base station allocates paging information to a mobile subscriber station entering an idle mode via an idle mode response message (DREG-CMD) in the early stage and is then able to change the paging information of the mobile subscriber station using a paging message transmitted to the mobile subscriber station each paging cycle. In this case, the paging information includes a paging group ID, a paging cycle and a paging offset.

Table 7 shows an example of a format of a paging message according to one preferred embodiment of the present invention, in which a format for a paging cycle and a paging offset are added to the related art paging message shown in Table 4 and in which action codes for the paging information change are defined.

TABLE 7

| Syntax | Size | Notes |
|---|---|---|
| MOB_PAG-ADV_Message_Format( ) { | | |
| Management Message Type=?? | 8 bits | |
| Num Paging Group IDs | 8 bits | Number of Paging Group IDs in this message |

TABLE 7-continued

| Syntax | Size | Notes |
|---|---|---|
| For (i=0; i<Num_Paging_Group_IDs; i++) { | | |
| Paging Group ID | 8 bits | |
| Paging Cycle | 16 bits | Cycle by which a paging message is transmitted with the paging group |
| Paging Offset | 8 bits | Frame decision within cycle of paging message transmission (needs to be smaller than a paging cycle value) |
| } For(j=0; j<Num_MACs; j++) { | | Number of MSS MAC Addresses in message can be determined from the length of the message (found in the generic MAC header). |
| MSS MAC address hash | 24 bits | The hash is obtained by computing a CRC24 on the MSS 48-bit MAC address. The polynomial for the calculation is 0x864CFB. |
| Action Code | 2 bits | Paging action instruction to MSS 00 = Paging Cycle/Offset change 01 = Perform Ranging to establish location and acknowledge message 10 = Enter Network 11 = Reserved |
| Reserved | 6 bits | |
| } } | | |

In case that the base station changes paging information of a specific idle-mode mobile subscriber station, a paging message having the changed format shown in Table 7 is transmitted as the paging message periodically transmitted to the idle-mode mobile subscriber station. Namely, the base station sets the paging cycle and the paging offset to values to be changed, respectively and sets the action code to 'paging information change' (Action Code=00: Change paging cycle/offset) and then transmits the set values to the corresponding mobile subscriber station.

The mobile subscriber station having received the paging message changes the paging information into the values set in the paging cycle and offset items if the action code within the paging message is set to 'paging information change'. Thereafter, the mobile subscriber station receives the paging message according to the changed paging information.

The base station transmits the information for the idle-mode mobile subscriber station having the changed paging information to other base stations belonging to the same paging group via a backbone message. Each of the base stations then transmits a paging message to the mobile subscriber station to correspond to the changed paging cycle and offset.

Table 8 shows an example of a data format of a backbone message informing a change of paging information according to one preferred embodiment of the present invention, in which an action code defining the change of the paging information is added to Action Code of the backbone message.

TABLE 8

| Field | Size | Notes |
| --- | --- | --- |
| Message Type | 8 bits | |
| Sender BS-ID | 48 bits | Base station unique identifier (Same number as that broadcasted on the DL-MAP message) |
| Target BS-ID | 48 bits | Base station unique identifier (Same number as that broadcasted on the DL-MAP message) |
| Time Stamp | 32 bits | Number of milliseconds since midnight GMT |
| Num MSS | 8 bits | Number of MSS paged according to action code |
| For(j=0; j<Num Records; j++) { | | |
| MMS MAC address | 48 bits | |
| PAGING_CYCLE | 16 bits | Cycle in which the paging message is transmitted within the paging group |
| PAGING OFFSET | 8 bits | PAGING OFFSET parameter |
| Action Code | 3 bits | 0: Add MSS MAC address to a paging list<br>1: Delete MSS MAC address from the paging list<br>2: MSS needs to be paged to set a location and an approval message.<br>3: MSS needs to be paged to enter a network<br>4: Change paging cycle/offset for MMS<br>5~7: Reserved |
| Reserved | 5 bits | |
| } | | |
| Security field | TBD | A means to authenticate this message |
| } | | |

The base station having received the backbone message confirms that the backbone message is associated with the change of the paging information via the action code of the backbone message and then changes the paging information into the values that are set in the paging cycle and offset items.

INDUSTRIAL APPLICABILITY

Accordingly, the present invention is applicable to a wireless communication system supporting an idle mode as well as is used for a broadband wireless access system. And, the present invention has the following effects.

First of all, in the paging information allocating method in the broadband wireless access system according to the present invention, in case that the mobile subscriber station enters the idle mode via the base station belonging to at least two paging groups, the paging information of the entire paging groups, to which the base station belongs, is allocated to the mobile subscriber station so that the mobile subscriber station can maintain the idle mode instead of terminating the idle mode in case of moving away into another base station of another one of the paging groups and can minimize its power consumption.

Secondly, in the paging information allocating method in the broadband wireless access system according to the present invention, in case that the mobile subscriber station enters the idle mode via the base station belonging to at least two paging groups, the paging information of the paging group having the smaller paging load among the paging groups of the base station is primarily allocated to the mobile subscriber station to balance the paging load.

Thirdly, in the paging information allocating method in the broadband wireless access system according to the present invention, the paging cycle and offset of the mobile subscriber station can be changed via the paging message while the mobile subscriber station maintains the idle mode as well as in case that the base station makes the mobile subscriber station enter the idle mode. Hence, the base stations operating the idle mode can flexibly control the mobile subscriber station and can efficiently utilize the network resources by controlling the load balancing of the paging message.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of controlling an idle mode by a base station in a broadband wireless access system, the method comprising:
receiving, at the base station, a message from a mobile subscriber station, the message used for requesting a transition to the idle mode, wherein the base station belongs to at least two paging groups, each of the at least two paging groups having a paging cycle and a paging offset;
transmitting, to the mobile subscriber station, paging information including first paging cycles and first paging offsets of the at least two paging groups;
transmitting, to the mobile subscriber station, first paging messages, wherein the first two paging messages are transmitted according to the first paging cycles and the first paging offsets of the at least two paging groups;
transmitting, to the mobile subscriber station, second paging messages including second paging cycles and second paging offsets of the at least two paging groups, and further including an action code instructing the mobile subscriber station to change paging cycles and paging offsets of the mobile subscriber station to the second paging cycles and the second paging offsets; and
transmitting, to the mobile subscriber station, third paging messages according to the second paging cycles and the second paging offsets of the at least two paging groups.

2. The method of claim 1, further comprising notifying different base stations belonging to the at least two paging groups that the mobile subscriber station has entered the idle mode.

3. The method of claim 2, further comprising:
notifying the different base stations that downlink traffic to be transmitted to the mobile subscriber station has been generated if the downlink traffic is generated; and
instructing the mobile subscriber station to terminate the idle mode and to re-enter a network.

4. The method of claim 1, wherein the paging information is transmitted via an idle mode response message.

5. A method of controlling an idle mode in a mobile subscriber station of a broadband wireless access system, the method comprising:
receiving, from a base station belonging to at least two paging groups, paging information including first paging cycles and first paging offsets of the at least two paging groups, wherein each of the at least two paging groups has a paging cycle and a paging offset;

receiving, from the base station, first paging messages according to the first paging cycles and the first paging offsets of the at least two paging groups;

receiving, from a base station, second paging messages including second paging cycles and second paging offsets of the at least two paging groups, and further including an action code instructing the mobile subscriber station to change paging cycles and paging offsets of the mobile subscriber station to the second paging cycles and the second paging offsets; and receiving, from the base station, third paging messages according to the second paging cycles and the second paging offsets of the at least two paging groups.

6. The method of claim 5, further comprising:

detecting that the mobile subscriber station has moved to an area of a different base station belonging to only a specific one of the at least two paging groups; and receiving a fourth paging message according to only paging information of the specific one of the at least two paging groups.

7. The method of claim 5, wherein the paging information is transmitted via an idle mode response message.

* * * * *